(12) United States Patent
Williams

(10) Patent No.: US 7,637,732 B2
(45) Date of Patent: *Dec. 29, 2009

(54) DIE FOR EXTRUDING MATERIAL

(75) Inventor: Edward Williams, St. Louis, MO (US)

(73) Assignee: Good Earth Tools, Inc., Crystal City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/969,135

(22) Filed: Jan. 3, 2008

(65) Prior Publication Data

US 2008/0102149 A1    May 1, 2008

Related U.S. Application Data

(63) Continuation of application No. 11/122,664, filed on May 5, 2005, now Pat. No. 7,316,557.

(60) Provisional application No. 60/569,367, filed on May 8, 2004.

(51) Int. Cl.
B29C 47/00    (2006.01)
B29B 9/06    (2006.01)
(52) U.S. Cl. .................. 425/313; 425/190; 425/464
(58) Field of Classification Search .............. 425/190, 425/311, 313, 463, 464
See application file for complete search history.

(56) References Cited

U.S. PATENT DOCUMENTS

| | | | | |
|---|---|---|---|---|
| 1,461,504 A | * | 7/1923 | Tanzi | 425/319 |
| 2,194,589 A | * | 3/1940 | Kunz | 425/463 |
| 2,908,037 A | * | 10/1959 | Harkenrider | 425/192 R |
| 3,181,201 A | * | 5/1965 | Seiz | 425/463 |
| 3,391,657 A | * | 7/1968 | Reese | 425/461 |
| 3,452,394 A | * | 7/1969 | McNeal, Jr. | 425/379.1 |
| 3,461,495 A | | 8/1969 | Swickard et al. | |
| 3,516,120 A | | 6/1970 | Braun et al. | |
| 3,553,776 A | * | 1/1971 | Romagano et al. | 425/311 |
| 3,599,285 A | * | 8/1971 | Hamilton | 425/307 |
| 3,618,162 A | * | 11/1971 | Scharer et al. | 425/67 |
| 3,756,758 A | | 9/1973 | Prall | |
| 3,778,495 A | * | 12/1973 | Woolley | 264/177.15 |
| 3,823,598 A | * | 7/1974 | Freeman | 72/467 |

(Continued)

FOREIGN PATENT DOCUMENTS

FR    2582981 A1 * 12/1986

(Continued)

*Primary Examiner*—Philip C Tucker
*Assistant Examiner*—Dimple N Bodawala
(74) *Attorney, Agent, or Firm*—Storm LLP; Paul V. Storm, Esq.; Mark D. Perdue, Esq.

(57) ABSTRACT

A die assembly and a process for using the die assembly is disclosed. The die plate is made of a material that is somewhat resistant to cracking when subjected to pressure of an extrudate material from behind the die assembly. A series of recesses are arranged about the circumference of the die plate, into which dies of a more hardened material are secured. Holes conforming to the shape of the desired extrudate are drilled through the die plate and dies. The surface of the dies is ground smooth so that there is consistent, even contact between the dies and the mechanism used for cutting the extrudate as it is pushed out of the holes in the dies.

18 Claims, 2 Drawing Sheets

U.S. PATENT DOCUMENTS

| | | | |
|---|---|---|---|
| 3,867,082 A | | 2/1975 | Lambertus |
| 3,986,816 A | * | 10/1976 | Gwinn et al. ............... 425/188 |
| 4,104,015 A | * | 8/1978 | Meyer .................... 425/382.2 |
| 4,167,386 A | | 9/1979 | Mallay |
| 4,220,616 A | * | 9/1980 | Pfeiffer et al. .............. 264/206 |
| 4,248,577 A | | 2/1981 | Bory et al. |
| 4,324,748 A | | 4/1982 | Hatakeyama et al. |
| 4,327,050 A | * | 4/1982 | Salmon ..................... 264/142 |
| 4,378,964 A | * | 4/1983 | Wolfe, Jr. .................. 425/463 |
| 4,470,790 A | | 9/1984 | Harada et al. |
| 4,504,210 A | | 3/1985 | Titz et al. |
| 4,514,348 A | | 4/1985 | Iguchi et al. |
| 4,564,350 A | * | 1/1986 | Holmes et al. ............... 425/313 |
| 4,574,609 A | | 3/1986 | Berecz |
| 4,654,350 A | | 3/1987 | Irmscher et al. |
| 4,678,423 A | | 7/1987 | Bertolotti |
| 4,687,433 A | | 8/1987 | Ozaki et al. |
| 4,708,618 A | | 11/1987 | Reifenhauser et al. |
| 4,743,191 A | * | 5/1988 | Chao ........................ 425/190 |
| 4,752,196 A | | 6/1988 | Wolfe, Jr. |
| 4,752,205 A | | 6/1988 | Moriyama et al. |
| 4,806,086 A | | 2/1989 | Bloch et al. |
| 4,822,546 A | * | 4/1989 | Lohkamp .................... 264/143 |
| 4,856,974 A | | 8/1989 | Wolfe, Jr. |
| 4,954,061 A | | 9/1990 | Repholz et al. |
| 5,067,885 A | | 11/1991 | Stevenson et al. |
| 5,110,276 A | | 5/1992 | Farnsworth et al. |
| 5,135,378 A | | 8/1992 | Catton |
| 5,238,385 A | | 8/1993 | Johnson |
| 5,246,361 A | | 9/1993 | Marchesani |
| 5,268,050 A | | 12/1993 | Azari |
| 5,342,189 A | | 8/1994 | Inamura et al. |
| 5,421,852 A | * | 6/1995 | Maruyama et al. ............ 75/239 |
| 5,424,018 A | | 6/1995 | Paul et al. |
| 5,609,600 A | | 3/1997 | Love et al. |
| 5,718,926 A | | 2/1998 | Dambrine et al. |
| 5,720,987 A | | 2/1998 | Ploog |
| 5,762,975 A | | 6/1998 | Rockstedt |
| 5,773,043 A | | 6/1998 | Hunter |
| 6,019,924 A | | 2/2000 | Montalbano |
| 6,143,071 A | | 11/2000 | Aihara et al. |
| 6,179,461 B1 | | 1/2001 | Christiano et al. |
| 6,196,823 B1 | | 3/2001 | Coyle et al. |
| RE37,235 E | | 6/2001 | Hauck et al. |
| 6,244,849 B1 | | 6/2001 | Bailey et al. |
| 6,290,483 B1 | * | 9/2001 | McIsaac et al. ......... 425/192 R |
| 6,296,468 B1 | | 10/2001 | Deutsch et al. |
| 6,346,293 B1 | | 2/2002 | Douris et al. |
| 6,352,426 B1 | | 3/2002 | Hutchinson et al. |
| 6,413,071 B1 | | 7/2002 | Helms, Jr. et al. |
| 6,497,713 B1 | | 12/2002 | Tompkins et al. |
| 6,511,309 B1 | | 1/2003 | Hunter |
| 6,521,353 B1 | | 2/2003 | Majagi et al. |
| 6,976,834 B2 | | 12/2005 | Knight et al. |
| 7,311,514 B2 | * | 12/2007 | Tatsuda et al. ............. 425/464 |
| 7,316,557 B2 | * | 1/2008 | Williams .................... 425/311 |

FOREIGN PATENT DOCUMENTS

| | | | | |
|---|---|---|---|---|
| JP | | 62196117 A | * | 8/1987 |
| JP | | 63075106 A | * | 4/1988 |

* cited by examiner

DIE FOR EXTRUDING MATERIAL

CLAIM OF PRIORITY

This application is a continuation of U.S. patent application Ser. No. 11/122,664 filed May 5, 2005 (now U.S. Pat. No. 7,316,557), which claims priority from U.S. Provisional Patent Application No. 60/569,367. filed May 8, 2004. Each application is hereby incorporated by reference for all purposes.

CROSS-REFERENCE TO RELATED APPLICATIONS

This application is also related to co-pending U.S. patent application Ser. No. 11/122,707, entitled "EXTRUDER SCREW WITH LONG WEARING SURFACES," which is hereby incorporated by reference for all purposes.

TECHNICAL FIELD

The present invention relates generally to the extruding of materials produced in a manufacturing process, and to the materials produced in extrusion manufacturing processes.

BACKGROUND OF THE INVENTION

It is known in manufacturing to produce a material in a continuously extruded stream, feed the material out through a die that gives the material the desired shape, and cut the material to a desired size(s) as it leaves the die. In extrusion manufacturing processes, extruder die plates are often mounted to the hub, or end, of extrusion machinery.

Conventionally, the die contains one or more shaped holes through which the material is extruded. A cutting device, typically a rotating cutting device, cuts off pieces of extruded material to the desired length as they emerge from the die. One drawback of this technology is that when the cutting edge(s) of the rotating cutting device become dull, the production process must be shut down so that the cutting blade may be removed, sharpened and re-installed, or replaced with a new blade. Further, dull blades can lead to misshapen products. The cost of blades, along with the cost of lost production time when the process had to be stopped for the blades to be replaced can be high.

Typically, the tolerance between the blade and extruder die plate is very tight to ensure precise cutting of extruded product. The constant rotation of the blade can cause wear to the cutting edge of the blade, over time. This wear can be increased when the fastening devices holding the extruder die plate and cutting blade loosen even slightly. Because of the tight tolerance between the blade and the die plate, even a slight movement or deviation can cause the blade to wobble or torque, causing increased wear. In use, the die plate is under pressure from the extrudate pushing on the rear side of the plate, and can flex outwardly towards the cutting blades. This can cause greater contact between the die plate and the cutting blades than is desired, which can cause binding, and faster wearing of the blade edge, and increased possibility of breaking of the cutting blade. Additionally, if the die plate is made of a material that is not sufficiently flexible, the die plate can crack if the pressure from the extrudate is too great.

Depending on the material being extruded, when the blade contacts the edge of the material that is coming out of the die plate, there is increased resistance, and the blade can torque slightly. Because of the tight tolerances, when the blade and/or the die plate torque, they can come in contact with each other. This will cause additional wear on the blade and/or the die plate. The wear of the die plate is greater around the extrusion holes, causing misshapen extruded products, which can necessitate replacement of the die plate, as well as the accelerated wear on the cutting blade.

What is needed, therefore, is an apparatus for extruding shaped materials that enables cutting blades to have longer cutting life, and that prolongs the life of the die plate and maintains a quality of extruded product.

SUMMARY OF THE INVENTION

The present invention, accordingly, provides a die assembly for use with an extruder that solves the problems of the prior art.

In one arrangement, the extruder die plate assembly is circular in form and circumscribes a circular opening that fits over the end or hub of the extrusion machinery. The extruder die plate assembly has a plurality of spaced-apart recesses around the circumference of the die plate. A die is secured in every recess in the die plate. In a preferred arrangement, the recesses are rounded-end parallelogram recesses, and a die of similar shape is secured in every recess in the die plate. The dies are typically made of a wear-resistant material, such as carbide or tungsten-carbide. The dies extend beyond the surface of the die plate, and are ground to a uniform height beyond the surface of the die plate.

In use, the side of the extruder die plate assembly that has the protruding die faces out toward the cutting blade. In use, cutting blade is in constant contact with the faces of the dies, which reduces or eliminates wobble or movement. The dies are preferably shaped and arranged on the plate so that the cutting blade(s) is in constant contact with the die faces such that there are no gaps or spaces into which the cutting blade can fall or catch, which can cause uneven cutting and an increased possibility for chipping or nicking of the blades. Because the dies are made of carbide or some other hardened material, wear is reduced on the cutting blade and the dies. Additionally, the carbide dies that are secured into the recesses in the die plate provide additional strength to the die plate, which prevents the die plate from torqueing out toward the cutting blade. Because the die plate does not flex in use, and because there is constant, even contact between the projecting die plates and the cutting blades, there is a reduction in binding, wear and poor product quality due to lack of clean cutting of extruded material. Consistent quality of cut product is especially important with products that are very lightweight, fine or small in size, and therefore more likely to be deformed.

An advantage achieved with the present invention is that the cutting blade and die plate have a prolonged life because there is continuous smooth contact between the cutting blade and the wear-resistant surface of the dies. Additionally, only the dies of the extruder die plate assembly need to be made of a high-quality, wear-resistant metal, such as tungsten carbide or carbide coated metals. The die plate can be made of a material such as a mild or tool or other material that is relatively inexpensive, which may be bonded to the dies, but which can also better withstand the pressure applied to the rear of the die plate from the extrudate, thus making the produce more economical.

Another advantage achieved with the present invention is that the dies may be readily secured into the die plate by means such as soldering, brazing or use of a bonding material.

Yet another advantage achieved with the present invention is that after the dies are secured into the die plate, the dies may be ground as necessary to ensure the surface of the dies is smooth, flat and perpendicular to the cutting blade, thus ensuring a clean cut of the extruded material.

Another advantage achieved with the present invention is that when dies do ultimately become worn, the mechanism can be removed, the dies reground to re-achieve a smooth surface, and the assembly can be re-used to prolong the life of the mechanism.

DETAILED DESCRIPTION OF THE PREFERRED EMBODIMENT

Figure 1:
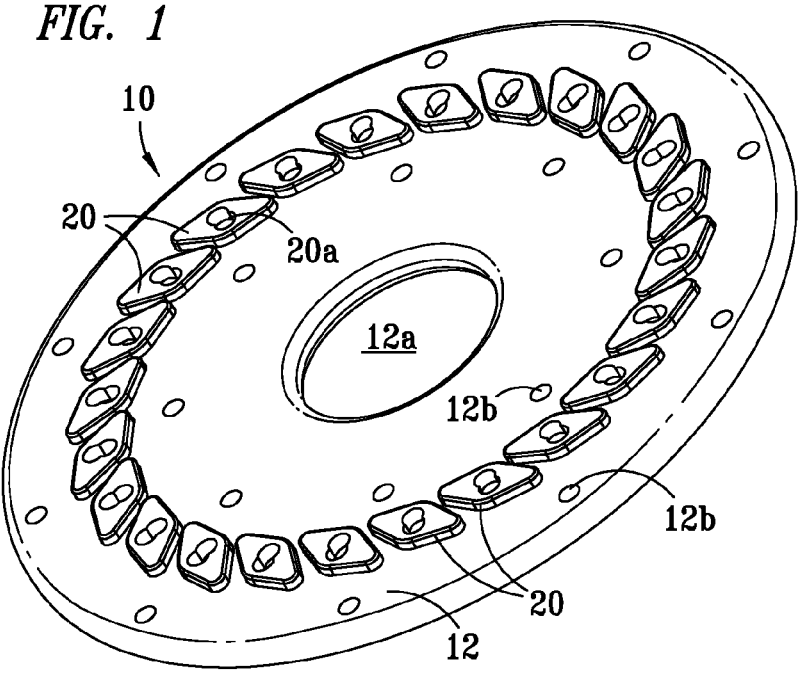
FIG. 1 is a perspective view of an extruder die plate assembly embodying the features of the present invention.

Referring now to FIG. 1, the reference numeral 10 designates, in general, an extruder die plate assembly embodying features of one arrangement of the present invention. As viewed in FIG. 2, the extruder die plate assembly 10 includes a die plate of a first material 12, with a series of spaced-apart parallelogram recesses 14 cut around the circumference thereof. As can be plainly seen in FIG. 1, a die 20 is inserted into each recess 14 in the die plate 12. The die plate 12 is preferably made of a material such as a mild or tool steel or other material that is relatively inexpensive and that is also wear-resistant and resists cracking when subject to a rear load from the extrudate. The die plate 12 defines a center opening 12a extending entirely through the die plate 12 through which the extruder hub (not shown) projects, and holes 12b, extending entirely through the die plate 12, and which are used to secure the die plate 12 to the extruder (not shown).

Figure 2:
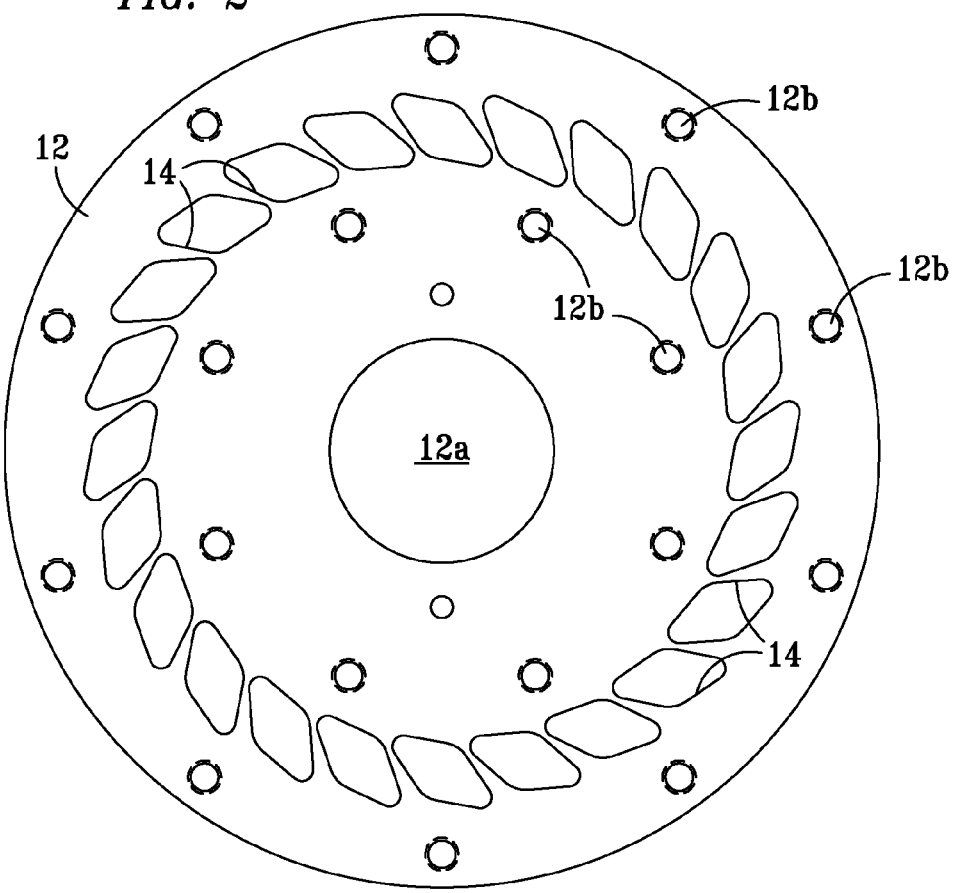
FIG. 2 is a front view of a die plate of the present invention.

Referring now to FIG. 2, it can be seen that the die plate 12 has a series of equally spaced recesses 14 about the circumference or in a ring. The number of recesses 14 in the die plate 12 may be varied to adapt the extruder die plate assembly 10 to the material being cut, and the frequency of cuts to be made in the material. However, in a preferred arrangement, the dies are shaped and arranged such that when in use, the dies provide a continuous contact surface for the cutting blade (not shown) with which it is being used. In other words, the polygonal, namely parallelogram, shaped recesses 14 are spaced apart and arranged such that a radial line extending from the center of the plate 12 to the circumference at all points about the circumference intersects at least one of the recesses 14.

Figure 3:
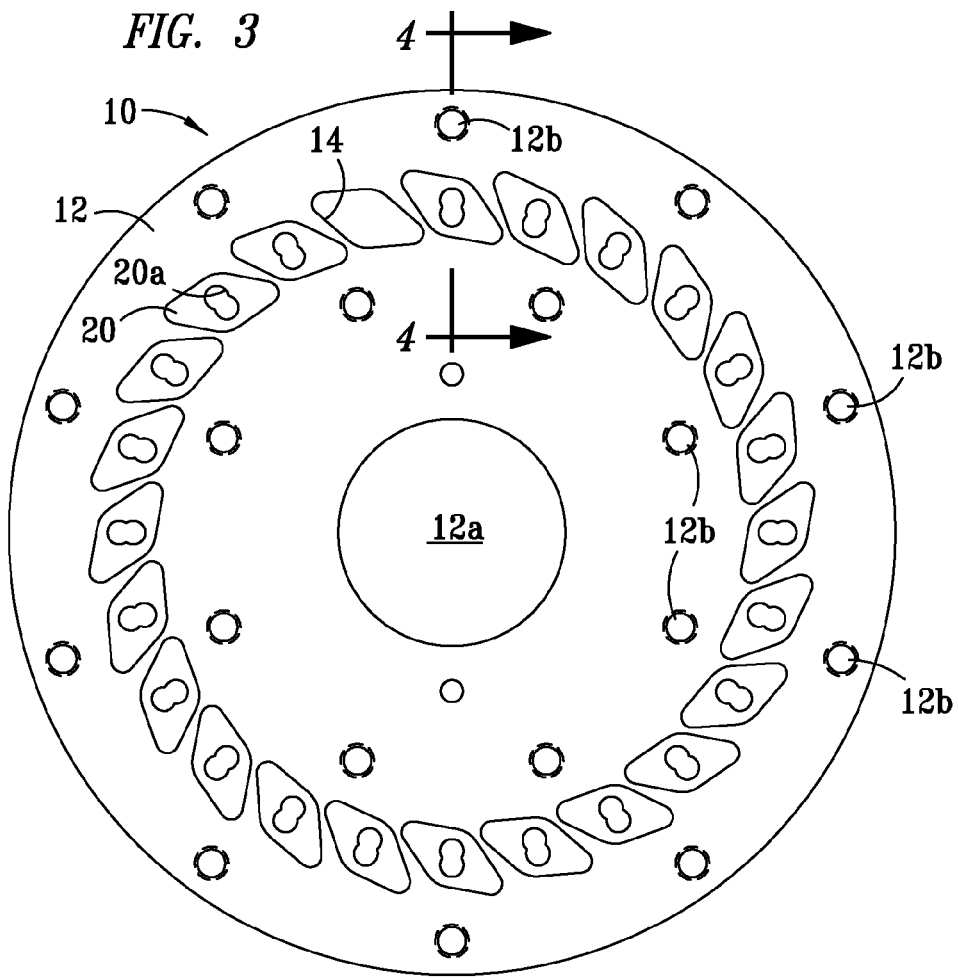
FIG. 3 is a front view of a die plate of the present invention with dies inserted in each recess around the circumference of the die.

Referring now to FIG. 3, it can be seen that a die 20 of appropriate size and shape has been inserted in the recesses 14 in the die plate 12. The dies 20 are secured to the die plate by means of a bonding material 30 (not shown), such as solder and the like, that preferably chemically bonds to the materials of the die plate 12 and die 20. In some cases, the bonding material 30 used must be heated to stimulate a chemical reaction, and the bond becomes permanent when the material 30 is returned to normal room temperature. The bonding material 30 may be solder, or some other glue, bonding material or the like that bonds well with the materials of which the die plate 12 and the dies 20 are made, and enables the dies 20 to provide sufficient rigidity to the extruder die plate assembly 10. The die 20 is preferably made of tungsten-carbide, carbide, or other like hardened materials, or made of a less hard material and coated with carbide, tungsten-carbide or other like hardened materials to provide a sharp, long-lasting smooth surface. After the dies 20 have been inserted in the die plate 12, the shaped holes 20a through which the material will extrude are drilled through the die and die plate.

Figure 4:
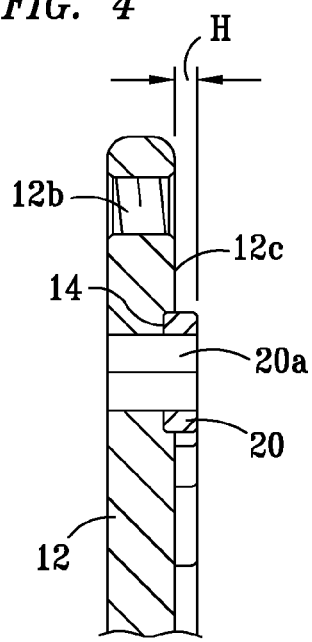
FIG. 4 is an enlarged cross-sectional view of a portion of an extruder die plate assembly of FIG. 3 taken along line 4-4 of FIG. 3.

As shown in FIG. 4, the die 20 protrudes beyond the face 12c of the die plate 12 to a height H. For precise, repeatable cuts, each die 20 must be a repeatable distance from the face of the die plate 12 and the cutter blade (not shown) when attached for use. For example, if the desired distance between the rear side of the die plate 12 and the cutter blade (not shown) should be 0.5 inches, the die plate 12 would typically have a thickness of about 0.375 inches, and the dies 20 would be ground so that they extend to a height approximately 0.125 inches beyond the face 12c of the die plate 12. In the above example, although there may be slight variances in the thickness of the die plate 12 and die 20, the desired outcome is that as a unit, the thickness should be about 0.5 inches. To achieve this precise size and ensure all the edges are smooth so that neither the dies nor the extruded material will catch or bind with the cutter blade (not shown), the surfaces of the dies 20, and if necessary, the die plate 12 are ground. Because of the insertion of the dies 20 of a hardened material in the die plate 12 made of a more flexible material, the die plate assembly 10 has an increased strength and rigidity that prevents the die plate 12 from cracking during use due to the pressure of the extrudate being pressed through the extruder against the rear of the die plate assembly 10, but has increased wear-resistance of the dies 20.

It is understood that the present invention can take many forms and embodiments. The embodiments described herein are intended to illustrate rather than to limit the invention. Accordingly, several variations may be made in the foregoing without departing from the spirit or the scope of the invention. For example, the extruder die plate assembly 10 may be attached to a shaft of a machine other than an extrusion machine, or may be secured in a different manner than attaching to a machine shaft. The die plate 12 and dies 20 may be made of a variety of materials, metallic or non-metallic, as appropriate to the cutting function being performed, as long as the combination of materials used provides sufficient rigidity to the die plate assembly 10 to prevent torqueing of the die plate assembly 10 in use due to pressure from extrudate against the rear of the die plate assembly.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A die plate assembly, comprising:
   a circular die plate having a first face and a center;
   a plurality of dies secured to the first face and arranged around the center at a selected distance therefrom, each die having a generally polygonal shape, and each die being dimensioned and arranged such that any line extending from the center and generally parallel to the first face intersects at least one die; and
   a plurality of passages, each passage extending through the die plate and at least one die.

2. The assembly of claim 1, wherein the dies being generally shaped as a parallelogram having a pair of opposite angles of less than 90°.

3. The assembly of claim 1, wherein the dies are brazed to the first face.

4. The assembly of claim 1, wherein the plate is made of steel.

5. The assembly of claim 1, wherein the dies are made of tungsten carbide.

6. The assembly of claim 1, wherein the dies are arranged in a circle about the center.

7. An assembly for receiving and forming an extrudate having a die plate with a first face and a center, comprising:
   a plurality of dies secured to the first face and arranged around the center at a selected distance therefrom, each die having a generally polygonal shape, and each die being dimensioned and arranged such that any line that extends from the center and generally parallel to the first face intersects at least one die, and each die being in fluid communication with the extrudate.

8. The assembly of claim 7, wherein the assembly further comprises a plurality of passages, each passage extending through the die plate and at least one die.

9. The assembly of claim 7, wherein the dies being generally shaped as a parallelogram having a pair of opposite angles of less than 90°.

10. The assembly of claim 7, wherein the dies are brazed to the first face.

11. The assembly of claim 7, wherein the plate is made of steel.

12. The assembly of claim 7, wherein the dies are made of tungsten carbide.

13. The assembly of claim 7, wherein the dies are arranged in a circle about the center.

14. A die plate assembly, comprising:
   a circular die plate having a first face and a center;
   a plurality of dies secured to the first face and arranged in a circle around the center, each die being dimensioned and arranged such that any line extending radially outward from the center intersects at least one die; and
   a plurality of passages, each passage extending through the die plate and at least one die.

15. The assembly of claim 14, wherein the dies being generally shaped as a parallelogram having a pair of opposite angles of less than 90°.

16. The assembly of claim 14, wherein the dies are brazed to the first face.

17. The assembly of claim 14, wherein the plate is made of steel.

18. The assembly of claim 14, wherein the dies are made of tungsten carbide.

* * * * *